United States Patent [19]
Watanabe et al.

[11] Patent Number: 4,563,699
[45] Date of Patent: Jan. 7, 1986

[54] TELEVISION RECEIVER OR PROJECTION TYPE

[75] Inventors: Toshiro Watanabe, Kanagawa; Takashi Tohyama; Akio Ohkoshi, both of Tokyo, all of Japan

[73] Assignee: Sony Corporation, Tokyo, Japan

[21] Appl. No.: 467,856

[22] Filed: Feb. 18, 1983

[30] Foreign Application Priority Data

Feb. 26, 1982 [JP] Japan .................................. 57-31354

[51] Int. Cl.[4] ............................................. H04N 9/31
[52] U.S. Cl. ...................................... 358/60; 353/33; 353/32
[58] Field of Search ........................ 358/60; 353/32, 33

[56] References Cited

U.S. PATENT DOCUMENTS 2,837,676  6/1958  Michlin ................................ 358/60
4,294,524  10/1981  Stolov ................................ 358/60

Primary Examiner—John W. Shepperd
Attorney, Agent, or Firm—Lewis H. Eslinger; Alvin Sinderbrand

[57] ABSTRACT

A television receiver of projection type including a color cathode ray tube having a phosphor face forming a color phosphor pattern, a projection screen, a projection lens for projecting an image on the cathode ray tube on the projection screen, and a prism plate having a plurality of prisms disposed in front of the color cathode ray tube for splitting a light path from the color cathode ray tube so as to shift the images relative to each other by a predetermined distance on the projection screen, wherein the inclination angle of each prism of the prism plate is selected different between at central portion and at peripheral portion.

10 Claims, 31 Drawing Figures

SCREEN 4

SCREEN 4

SCREEN 4

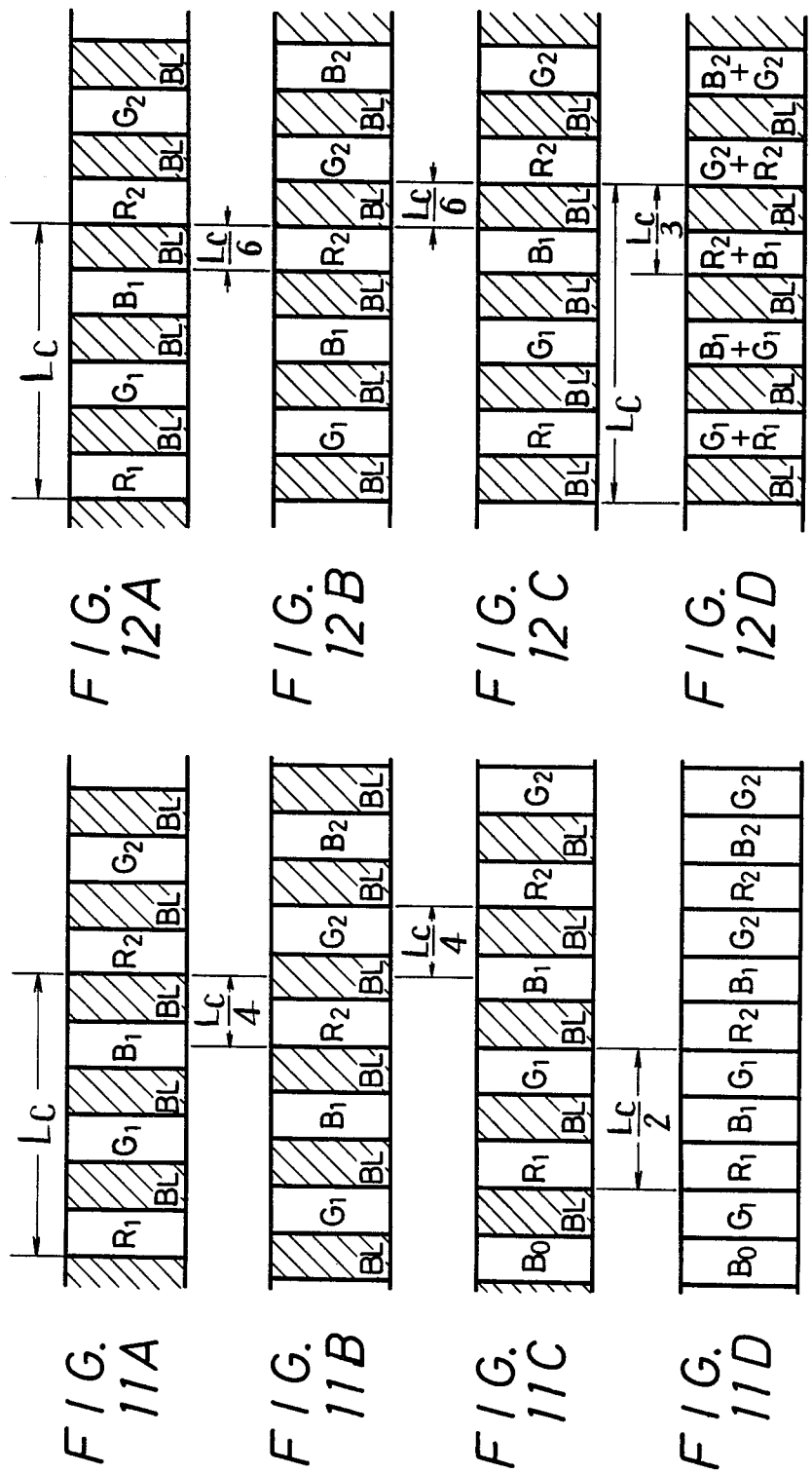

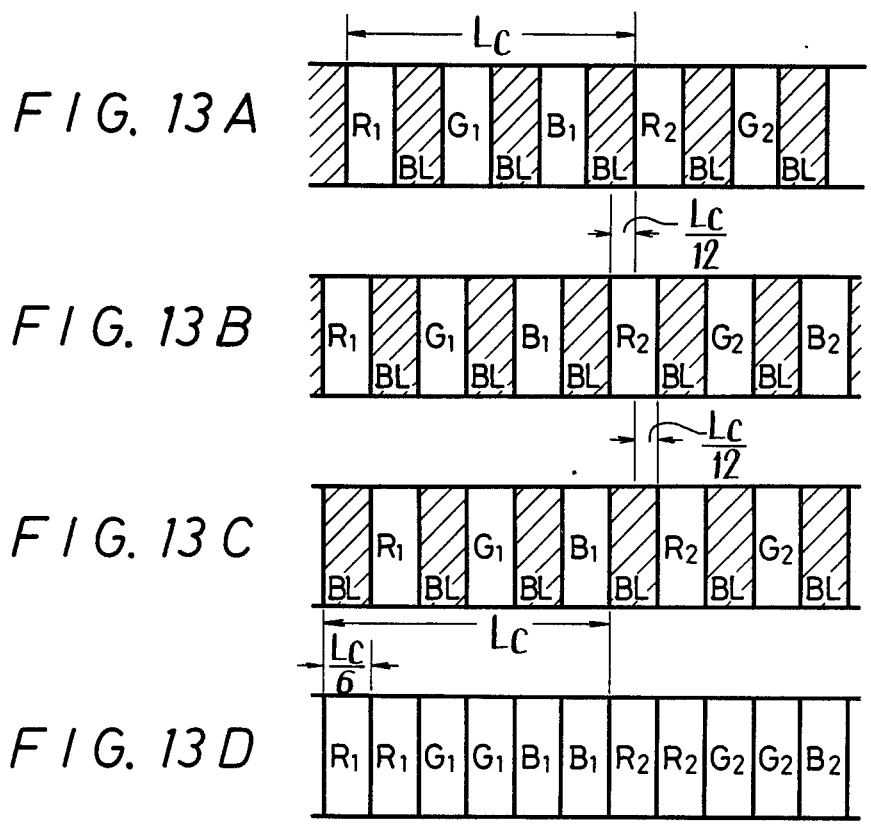

FIG. 15
| 9° | 9.5° | 10° | 10.5° | 10° | 9.5° | 9° |
|---|---|---|---|---|---|---|
| 9.5° | 10° | 10.5° | 11° | 10.5° | 10° | 9.5° |
| 10° | 10.5° | 11° | 11.5° | 11° | 10.5° | 10° |
| 9.5° | 10° | 10.5° | 11° | 10.5° | 10° | 9.5° |
| 9° | 9.5° | 10° | 10.5° | 10° | 9.5° | 9° |
9° ... 9°
9.5° ... 9.5°
9.5° ... 9.5°
(ANGLES OF PRISMS IN PLATE)
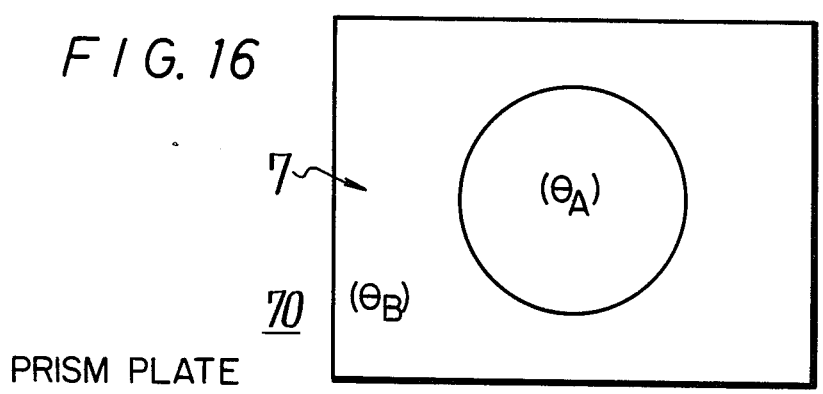
FIG. 16
PRISM PLATE
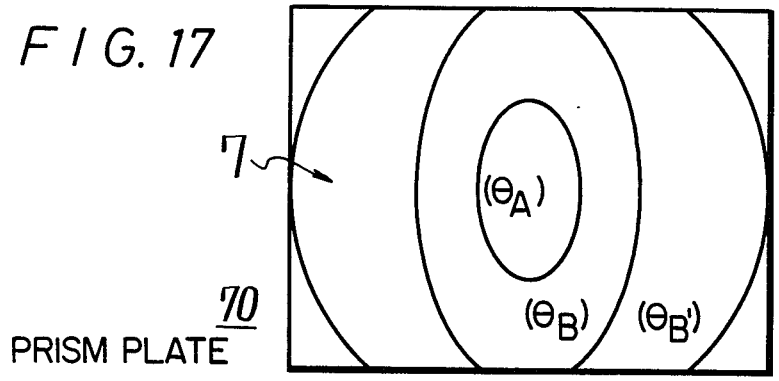
FIG. 17
PRISM PLATE

TELEVISION RECEIVER OR PROJECTION TYPE

BACKGROUND OF THE INVENTION

1. Field of the Invention

The present invention relates generally to a television receiver of projection type and is directed more particularly to a color television receiver of the projection type which can avoid without causing distortion in an image that a color phosphor pattern of a phosphor face of a color cathode ray tube is projected on a screen conspicuously.

2. Description of the Prior Art

In the art, a television receiver of a projection type using a color cathode ray tube of a single tube type is theoretically formed as depicted in FIG. 1.

In FIG. 1, reference numeral 1 generally indicates a color cathode ray tube whose phosphor face 1a is made as a color phosphor pattern of stripes. The image light on the phosphor face 1a of the color cathode ray tube 1 is projected through a projection lens 3 on a screen 4 to form a magnified image 5. In this case, at the same time when the magnified image 5 is formed on the screen 4, as shown in FIG. 2, the pattern of stripe-shaped color phosphors (color stripe pattern) forming the phosphor face 1a is formed on the screen 4 in a magnified scale, which is conspicuous, so that the magnified image 5 on the screen 4 is difficult to be seen.

In the prior art, in order to make the color stripe pattern inconspicuous on the screen 4, such a method has been proposed in which, as shown in FIG. 3, between the projection lens 3 and the color cathode ray tube 1 and near the projection lens 3 there is provided a light path splitting means, for example, a prism 6 having a given inclination angle $\theta$. In this case, the image light emitted from a point $\underline{P}$ on the phosphor face 1a of the color cathode ray tube 1 is split in its light path into two paths by one and other prism faces 6a and 6b of the prism 6 and then projected on the screen 4 at two points Pa and Pb. As a result, as shown in FIG. 4, on the screen 4 there are formed two magnified images 5a and 5b which are parallely moved little in the horizontal direction within a region less than a alignment pitch $L_C$ of, for example, one set of color stripes and resultantly these magnified images 5a and 5b are synthesized as a magnified image 5 on the screen 4. In this case, the number of the color stripes of the magnified image 5 is twice that of the original color phosphor stripes so that the color stripe pattern becomes inconspicuous on the screen 4.

According to the prior art method shown in FIG. 3, however, the following defect is caused. That is, as shown in FIG. 5 by the broken lines, the incident angles of the image lights from a central point $\underline{S}$ and peripheral points $\underline{L}$ and $\underline{R}$ on the phosphor face $\overline{1a}$ of the color cathode ray tube 1 to a predetermined point $\underline{K}$ on the prism face of the prism 1 are always different and hence the displacement of the image on the screen 4 (not shown in FIG. 5) is always different between the central portion and the peripheral portions of the screen 4 so that distortion is generated in the magnified images 5a and 5b on the screen 4.

In order to explain the above further in detail, with reference to FIG. 6 such a case will be now described in which the light from a predetermined point on the screen 4 (not shown in FIG. 6) is conducted through the prism 6 to the phosphor surface 1a.

In FIG. 6, it be assumed that the refractive index of the substance forming the prism 6 at the side of the screen 4 is taken as n1 and the refractive index of the same at the side of the phosphor face 1a as n2(<n1).

As shown in FIG. 6A, if the light from the screen 4 is incident on the prism 6, where the inclination angle of its prism face 6f is $\theta_1$, with the incident angle of $\alpha_1$, its emitting or refractive angle $\beta_1$ becomes such a value to satisfy the following expression.

$$\frac{\sin \alpha_1}{\sin \beta_1} = \frac{n2}{n1} \tag{1}$$

At this time, a difference $\phi_1$ between the light propagation direction (broken line direction in FIG. 6A) where there is no prism 6 and the light propagation direction where the prism 6 exists is expressed as follows:

$$\phi_1 = \beta_1 - \alpha_1 \tag{2}$$

This difference $\phi_1$ causes the displacement of $\overline{P_1Q_1}$ on the phosphor face 1a.

Next, as shown in FIG. 6B, if the light from the screen 4 is introduced to the similar prism face 6f at the incident angle of $\alpha_2(>\alpha_1)$, its refractive angle $\beta_2$ satisfies the following expression.

$$\frac{\sin \alpha_2}{\sin \beta_2} = \frac{n2}{n1} \tag{3}$$

At this time, a difference $\phi_2$ between the light propagation direction (broken line direction in FIG. 6B) where there is no prism 6 and the light propagation direction where the prism 6 exists is expressed as follows:

$$\phi_2 = \beta_2 - \alpha_2 \tag{4}$$

This difference $\phi_2$ causes the displacement of $\overline{P_2Q_2}$ on the phosphor face 1a.

If the expressions (1) and (2) are expressed by a general expression with the incident angle $\alpha$ and the refractive angle $\beta$, the following equation is obtained.

$$\frac{\sin \alpha}{\sin \beta} = \frac{n2}{n1} \tag{5}$$

From the equation (5), the refractive angle $\beta$ can be obtained as follows:

$$\beta = \sin^{-1}\left(\frac{n2}{n1} \sin \alpha\right) \tag{6}$$

Thus, the difference $\phi$ between the light propagation directions in cases of prism 6 and no prism can be expressed as follows:

$$\phi = \beta - \alpha \tag{7}$$

$$= \sin^{-1}\left(\frac{n2}{n1} \sin \alpha\right) - \alpha$$

Now, if, for example, n1=1.531, n2=1.490 and the incident angle $\alpha$ is varied as 10°, 30°, 45° and 60°, the value of $\phi$ becomes as expressed in the following table.

| $\alpha$ (degree) | $\phi$ (degree) |
|---|---|
| 10 | $2.78 \times 10^{-1}$ |
| 30 | $9.14 \times 10^{-1}$ |
| 45 | 1.598 |
| 60 | 2.853 |

From the above table it will be understood that since $\alpha_2 > \alpha_1$, $\phi_2 > \phi_1$ and accordingly, $\overline{P_2Q_2} > \overline{P_1Q_1}$. Therefore, it is understood that as the incident angle $\alpha$ of the light to the prism face 6f becomes large, the displacement on the phosphor face 1a for the case of no prism 6 becomes large.

The above description is made on the case where the light from the predetermined portion on the screen 4 is introduced to the phosphor face 1a through the prism 6, by way of example. However, in the case that the propagation direction of light is opposite, namely the image light from the phosphor face 1a is introduced to the screen 4 through the prism 6, the similar displacement is generated.

By the way, now respective points forming the prism face 6f are taken into consideration. The image lights incident from the central portion S and peripheral portions L and R of the phosphor face 1a to the above respective points have incident angles with predetermined great and small relation always. In FIG. 5, for example, on the prism face 6a, the incident angle of the light thereto from the peripheral portion R is relatively large as compared with that of the light from the central portion S, while on a prism face 6b the incident angle of the light from the peripheral portion L is relatively large as compared with that of the light from the central portion S. Therefore, the displacements of the image lights from the central portion S and the peripheral portions L and R of the phosphor face 1a on the screen 4 differ from one another, and consequently distortion is generated in the magnified images 5a and 5b on the screen 4 as described above.

Even when the light similar to that shown in FIG. 6B is introduced to the prism face 6f, if the inclination angle of the prism face 6f is selected as $\theta_2 (< \theta_1)$ as shown in FIG. 6C, the incident angle $\alpha_2'$ of the light to the prism face 6f can be equivalently made small as follows:

$$\alpha_2' = \alpha_2 - (\theta_1 - \theta_2) \quad (8)$$

Accordingly, by suitably selecting the angle $\theta_2$, $\overline{P_2'Q_2'} = \overline{P_1Q_1}$ can be satisfied.

As described above, according to the prior art example of FIG. 3 (FIG. 5), distortion is generated in the images 5a and 5b formed on the screen 4 and this distortion can not be corrected by this prior art example shown in FIG. 3 (FIG. 5).

That is, since the projection lens 3 and the prism 6 are located near with each other in the example of FIG. 3, through almost all areas of the prism 6, the image light from the central portion S of the phosphor face 1a of the color cathode ray tube 1 (which image light is within the portion surrounded by lines $l_{S1}$ and $l_{S2}$ in FIG. 5) and the image light from the peripheral portions L and R (the portions surrounded by lines $l_{L1}$ and $l_{L2}$ and lines $l_{R1}$ and $l_{R2}$ in FIG. 5) commonly pass. Therefore, even if the configuration of the prism 6 is changed, the displacement of the image light can not be made equal between the central portion S and the peripheral portions L and R.

OBJECTS AND SUMMARY OF THE INVENTION

Accordingly, an object of the present invention is to provide a television receiver of a projection type free from the defects inherent to the prior art.

Another object of the present invention is to provide a television receiver of a projection type in which the displacement or shift of images between the central and peripheral portions of each of two pictures on a screen is made small to effectively prevent a color stripe pattern from being conspicuously projected on the screen without causing distortion on the image.

According to an aspect of the present invention, there is provided a television receiver of projection type which comprises:

(a) a color cathode ray tube having a phosphor face forming a color phosphor pattern;
(b) a projection screen;
(c) a projection lens means for projecting an image on said cathode ray tube to said projection screen; and
(d) a prism plate means comprising a plurality of prisms disposed in front of said color cathode ray tube for splitting a light path from said color cathode ray tube so as to shift said image each other by a predetermined distance on said projection screen; characterized in that an inclination angle of each prism of said prism plate means is selected different between at central portion and at peripheral portion.

The other objects, features and advantages of the present invention will become apparent from the following description taken in conjunction with the accompanying drawings through which the like references designate the same elements and parts.

BRIEF DESCRIPTION OF THE DRAWINGS

FIGS. 11A-D, 12A-D and 13A-D are respectively diagrams used to explain the color stripe patterns on a screen.

FIGS. 15, 16 and 17 are schematic diagrams each showing other examples of the prism plate of the invention.

DESCRIPTION OF THE PREFERRED EMBODIMENTS

Figure 1:
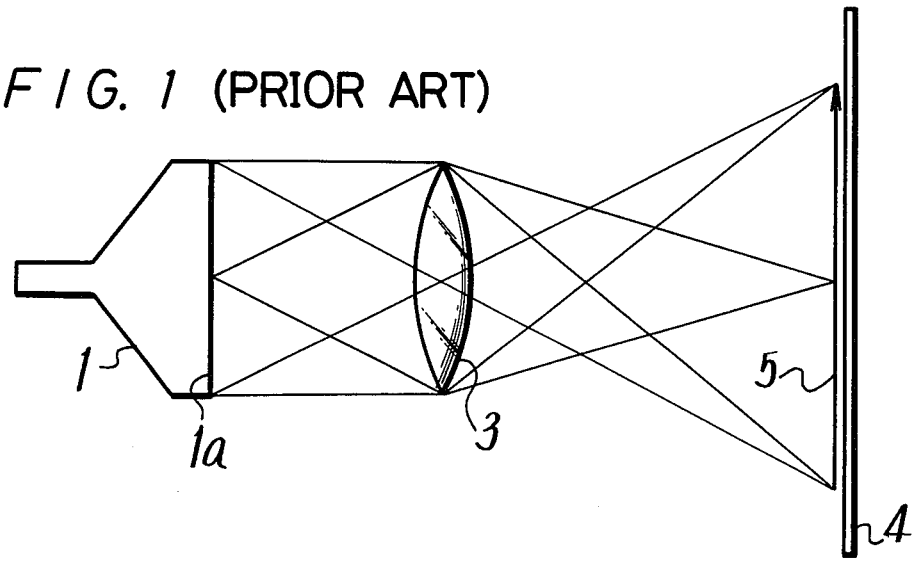
FIG. 1 is a schematic diagram showing an example of the prior art television receiver of a projection type using a single tube.
Figure 2:
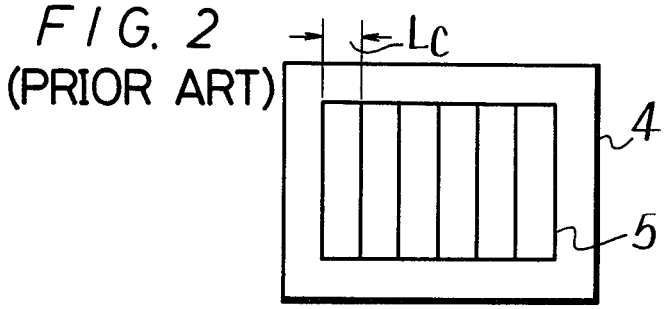
FIG. 2 is a front view of a screen used to explain the television receiver shown in FIG. 1.
Figure 3:
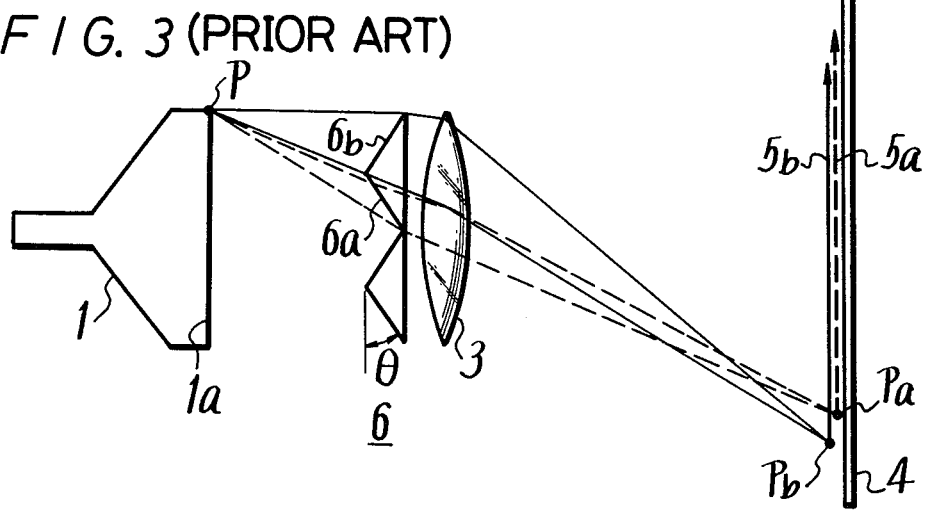
FIG. 3 is a schematic side view showing another example of the prior art television receiver of the projection type.
Figure 4:
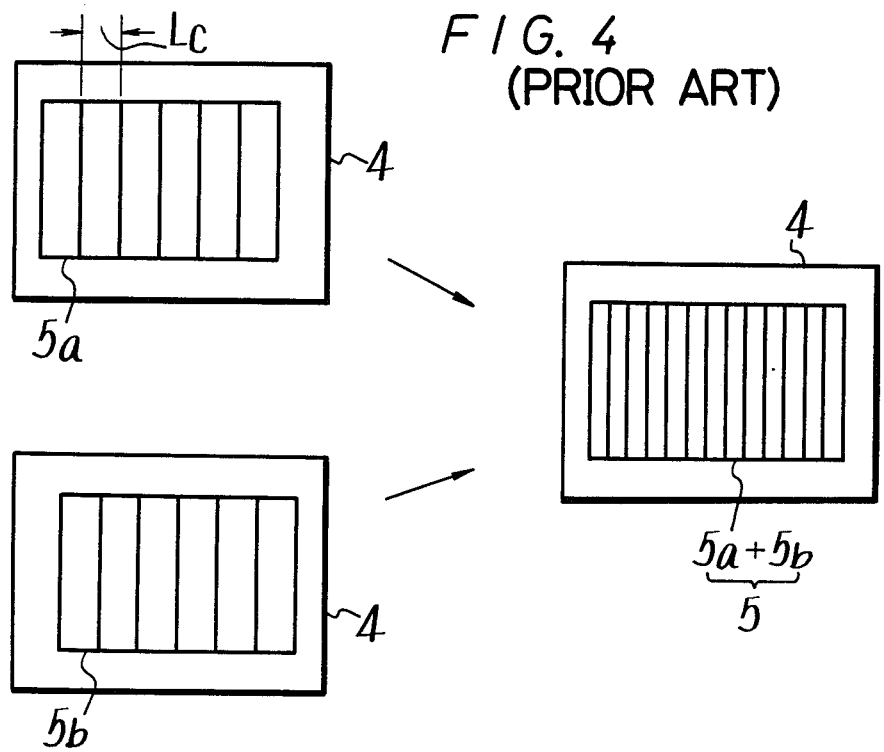
FIGS. 4, 5 and 6A-C are respectively schematic diagrams used to explain the prior art television receiver shown in FIG. 3.
Figure 5:
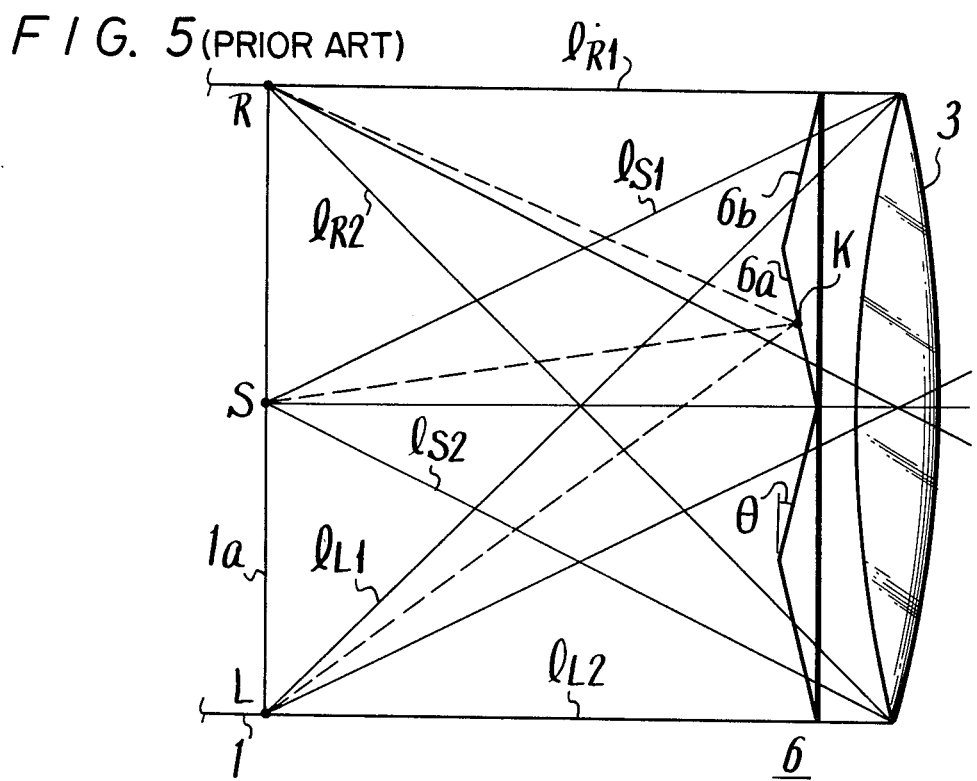

An example of the television receiver of a projection type according to the present invention will be first described with reference to FIGS. 7 and 8 in which the parts corresponding to those of FIGS. 1 and 5 are marked with the same references and their detailed description will be omitted.

Figure 7:
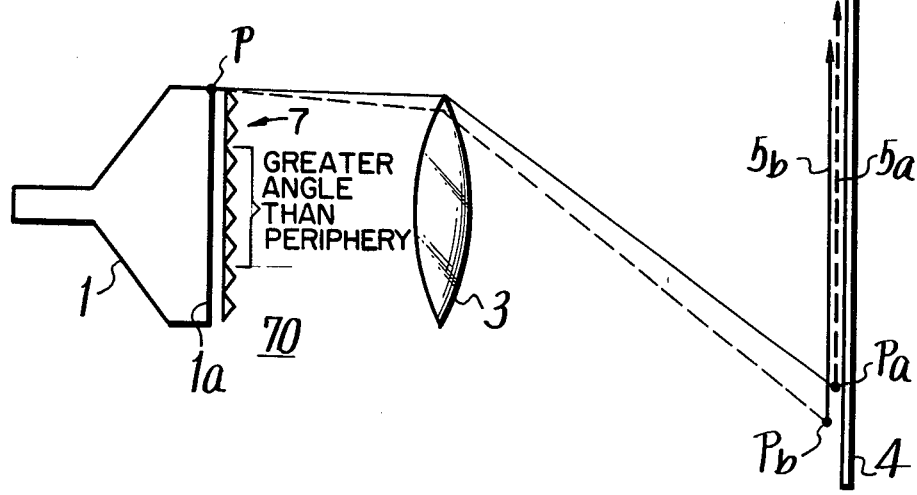
FIG. 7 is a schematic side view showing an example of a television receiver of a projection type according to the present invention.
Figure 8:
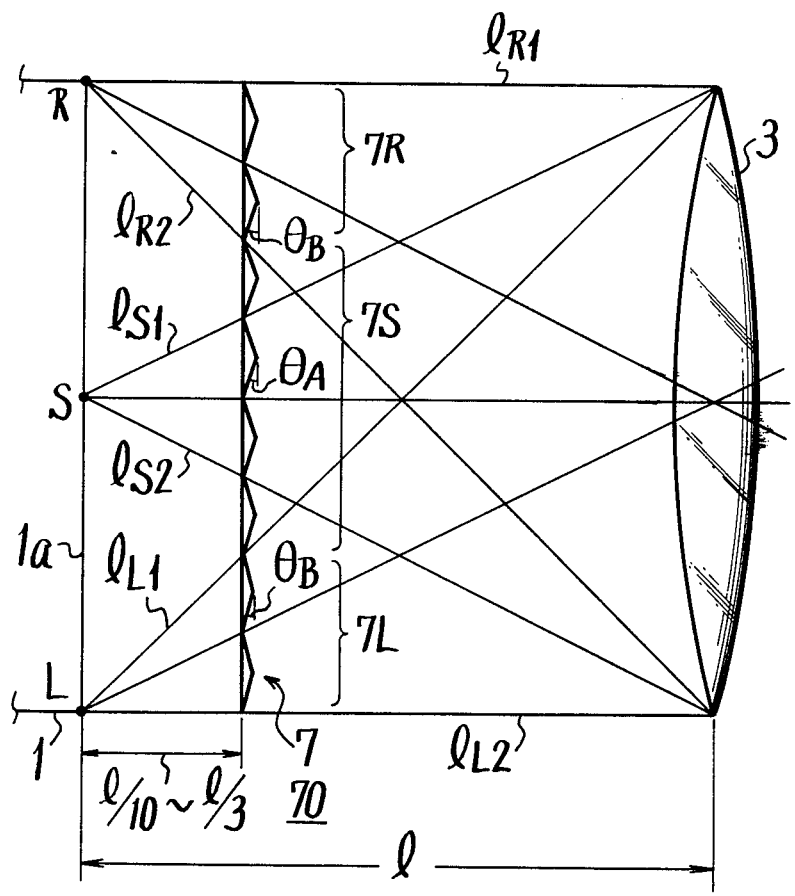
FIG. 8 is an enlarged view of the essential part of the example shown in FIG. 7.

In the example of the invention shown in FIGS. 7 and 8, a prism plate 7 on one surface of which formed are a prism group 7 is located near the phosphor face 1a of the color cathode ray tube 1. In this case, the inclination angles of the prism group 7 are selected different between the central portion and the peripheral portion thereof. That is, the prism plate 70 having formed thereon a plurality of fine prisms i.e. prism group 7 is located near or close to the phosphor face 1a of the color cathode ray tube 1 or if the distance between the phosphor face 1a and projection lens 3 is taken as l, the prism plate 70 is located at the position apart from the phosphor face 1a by 1/10 to 1/3.

Figure 9:
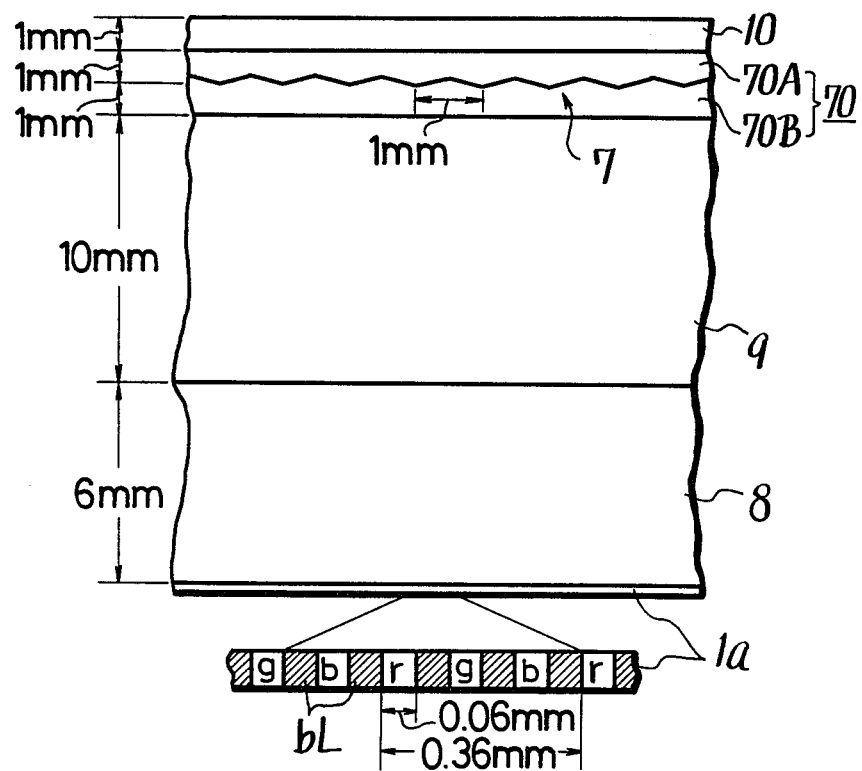
FIGS. 9 and 10 are respectively diagrams used for the explanation of the prism plate employed in the example shown in FIG. 7.

In this case, as shown in FIG. 9, the prism plate 70 is formed such that the boundary face between, for example, a transparent epoxy resin layer 70A having the refractive index 1.531 and an acrylic resin layer 70B having the refractive index 1.490 is made as a waveform or triangular corrugation-form to provide the prism group 7 on the boundary face with the alignment pitch of, for example, 1 mm. The prism plate 70 is fixed through, for example, a face plate 8 made of glass (which has the refractive index 1.525 and the thickness 6 mm) and a glass plate 9 (which has the refractive index 1.525 and the thickness 10 mm) to the phosphor face 1a of the color cathode ray tube 1. On the free surface of the prism plate 70, there is further formed a glass plate 10 (which has the refractive index 1.525 and the thickness 1 mm). In this example, red, green and blue color phosphor stripes r, g and b and a black stripe bL, which form the phosphor face 1a of the color cathode ray tube 1, have the width 0.06 mm each and the alignment pitch of one set of the color phosphor stripes r, g and b is 0.36 mm.

Figure 6A:
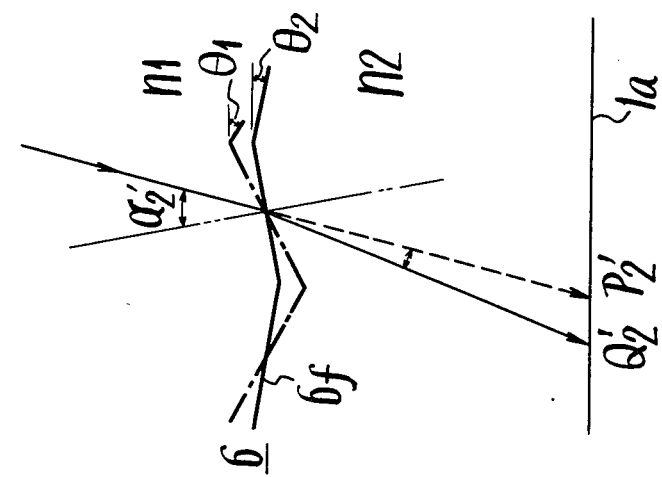
Figure 6B:
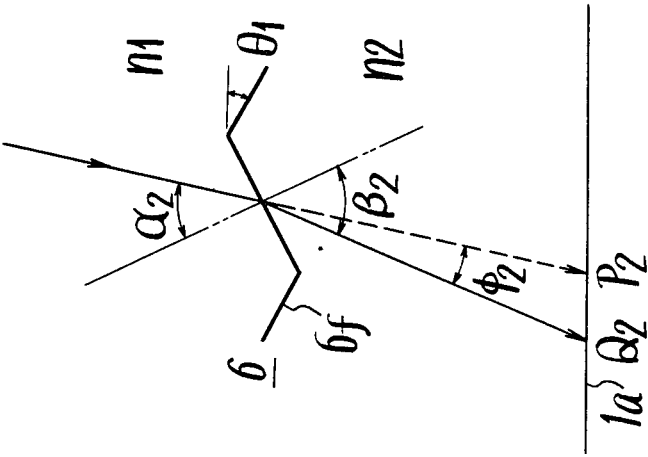
Figure 6C:
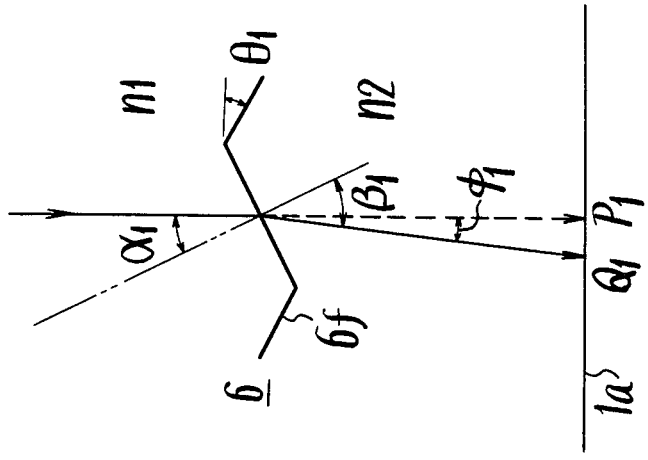

Turning back to FIG. 8, an inclination angle $\theta_B$ of the prism face of each of the prism groups 7L and 7R on the peripheral portions of the prism plate 70 is made smaller than an inclination angle $\theta_A$ of the prism face of each of the prism group 7S at the central portion of the prism plate 70. That is, as shown in FIG. 8, the inclination angle $\theta_A$ of the prism face of the prism group 7S, through which the image light emitted from the central portion S of the phosphor face 1a passes (the above image light is surrounded by lines $l_{S1}$ and $l_{S2}$ in FIG. 8), is so selected that the displacements or shifts of images 5a and 5b on the screen 4 (which is not shown in FIG. 8) become each a predetermined value. Then, the inclination angle $\theta_B$ of the prism face of the prism groups 7L and 7R, through which the image lights emitted from the peripheral portions L and R of the phosphor face 1a pass (the above image lights are respectively surrounded by lines $l_{L1}$ and $l_{L2}$ and those $l_{R1}$ and $l_{R2}$ in FIG. 8), are so selected that the displacements or shifts of images 5a and 5b on the screen 4 at their peripheral portions becomes similar to the shift at the central portion. In this case, since it will be clear from the description in relation to FIG. 6 that if $\theta_B = \theta_A$ is established, relative to the shifts of each of the images 5a and 5b at the central portion, the shifts thereof at the peripheral portions on one side become remarkably large, in the example of the invention shown in FIGS. 7 to 9, the inclination angles $\theta_A$ and $\theta_B$ are selected to satisfy the condition $\theta_B > \theta_A$ to make the incident angles of the image lights from the peripheral portions L and R to the prism faces small substantially and accordingly, to make the shifts of the images 5a and 5b at the peripheral portions on the screen 4 close to the shifts of the images at the central portion on the screen 4.

In the example shown in FIGS. 7 and 8, the prism plate 70 is made of eight prisms, but in practice the alignment pitch of the prisms is selected as, for example, about 1 mm as shown in FIG. 9, a number of prisms are formed.

Figure 10:
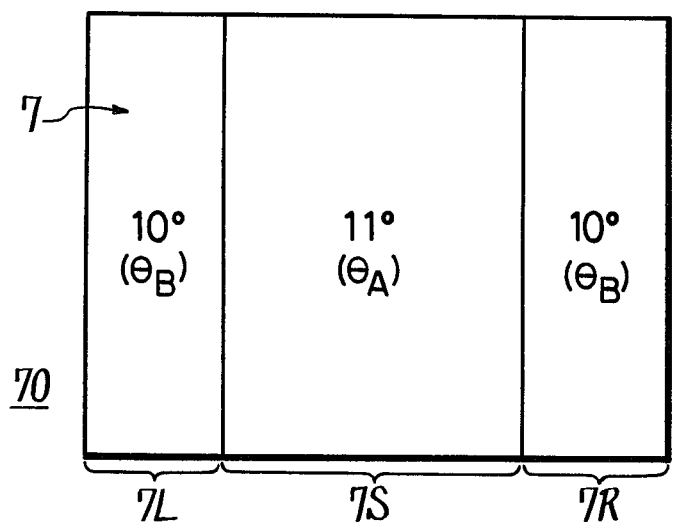

FIG. 10 is a front view of the prism plate 70. If the numerical relation shown in FIG. 9 is established, for example, the inclination angle of the prism face of each of the central prism group 7S is selected as 11° while that of the peripheral prism groups 7L and 7R is selected as 10°.

As set forth above, according to the example of this invention, the image light from the phosphor face 1a is split into two parts by the one and the other prism faces of the prism groups formed on the prism plate 70, similar to the prior art, the magnified images 5a and 5b are formed on the screen 4 in shifted relation by a predetermined distance. With this example of the invention, as described above, there is caused no distortion in the magnified images 5a and 5b. Further, if the inclination angle, for example, $\theta_A$ of the prism face of the prism group 7 formed on the prism plate 70 is varied, the distance between the shifts of the magnified images 5a and 5b can be freely varied.

FIGS. 11, 12 and 13 respectively shows the steps for explaining how the color stripe pattern is formed on the screen 4.

First, FIG. 11 shows such a case where when the alignment pitch of one set of the color stripes on the screen 4 is taken as $L_C$, due to the interposition or existence of the prism plate 70, the magnified images 5a and 5b which are shifted in the left and right directions by $L_C/4$ are formed on the screen 4, and then these images 5a and 5b are synthesized thereon.

FIG. 11A shows the color stripe pattern on the screen 4 when there is no prism plate 70, in which $R_1$, $R_2$, ... represent the color stripe corresponding to the red color phosphor stripe r on the phosphor face 1a of the color cathode ray tube 1; $G_1$, $G_2$, ... similarly represent the color stripe corresponding to the green phosphor stripe g; $B_1$, $B_2$, ... similarly represent the color stripe corresponding to the blue phosphor stripe b; and BL represents the parts corresponding to the black stripe bL, respectively.

When the magnified images 5a and 5b are respectively shifted in the left and right directions on the screen 4 by $L_C/4$ due to the existence of the prism plate 70, the stripe patterns on the screen 4 become as shown in FIGS. 11B and 11C, respectively.

Since these magnified images 5a and 5b are synthesized on the screen 4, the color stripe pattern on the screen 4 becomes as shown in FIG. 11D. In this case, in conclusion the alignment pitch of one set of color stripes becomes $L_C/2$ so that the image is made fine and hence the color stripes become inconspicuous.

FIG. 12 shows such a case where the magnified images 5a and 5b are respectively shifted in the left and right directions on the screen 4 by $L_C/6$ due to the existence of the prism plate 70 and these magnified images 5a and 5b are then synthesized.

Since FIGS. 12A, 12B and 12C are similar to FIGS. 11A, 11B and 11C in meaning, their detailed description will be omitted.

In case of FIG. 12, since the magnified images 5a and 5b shifted by $L_C/6 \times 2$ are synthesized on the screen 4, the color stripe pattern on the screen 4 becomes as shown in FIG. 12D. As a result, although the alignment pitch of the color stripes per se is not changed, the respective color stripes, each of which exists inherently in one stripe alignment pitch $1L_C$ (refer to FIG. 12A), appear two in one stripe alignment pitch $1L_C$. The image becomes fine apparently and hence the color stripe is made inconspicuous.

FIG. 13 shows such a case where the magnified images 5a and 5b are respectively shifted in the left and right directions on the screen 4 by $L_C/12$ due to the existence of the prism plate 70 and these magnified images 5a and 5b are then synthesized.

Since FIGS. 13A, 13B and 13C are similar to FIGS. 11A, 11B and 11C mentioned above in meaning, their detailed description will be omitted.

In case of FIG. 13, since the magnified images 5a and 5b shifted by $L_C/12 \times 2$ are synthesized on the screen 4, the color stripe pattern on the screen 4 becomes as shown in FIG. 13D. As a result, although the alignment pitch of the color stripes per se is not changed similar to the case of FIG. 12D where the magnified images 5a and 5b are shifted by $L_C/6$ respectively, the respective color stripes, each of which exists one inherently in one stripe alignment pitch $1L_C$ (refer to FIG. 13A), appear two in one stripe alignment pitch $1L_C$. The image also becomes fine apparently and accordingly the color stripe is made inconspicuous.

Now, the maximum frequency component, which can be represented by the respective color stripes (the least repeating alignment pitch is $L_C$) in the color stripe pattern on the screen 4 (shown in FIGS. 11A, 12A and 13A) where no prism plate 70 exists or is interposed, is assumed as $f_C$.

As shown in FIG. 11, when the shifts of the magnified images 5a and 5b through the prism plate 70 are $\pm L_C/4$, the least repeating alignment pitch of the respective color stripes becomes $L_C/2$ as shown in FIG. 11D. Therefore, the maximum frequency component, which can be represented by the respective color stripes of this case, becomes $2f_C$. From this fact, it will be understood that when the shift by the prism plate 70 is selected to be $\pm L_C/4$ as shown in FIG. 11, the image becomes fine and hence the color stripe is made inconspicuous.

Similarly, as shown in FIGS. 12 and 13, when the shifts of the magnified images 5a and 5b through the prism plate 70 are respectively $\pm L_C/6$ and $\pm L_C/12$, the least repeating alignment pitchs of the respective color stripes become $L_C/3$ and $L_C/6$ as shown in FIGS. 12D and 13D. Therefore, the maximum frequency components, which can be represented by the respective color stripes of these cases, become $3f_C$ and $6f_C$, respectively. From this fact, it will be understood that when the shifts by the prism plate 70 are selected to be $\pm L_C/6$ and $\pm L_C/12$ as shown in FIGS. 12 and 13 (where the color stripe alignment pitch per se is not changed), the images become fine and hence the color stripes are made inconspicuous, respectively.

In the above example of this invention, although the prism plate 70 is located near the phosphor face 1a of the color cathode ray tube 1, no Moire is generated on the screen 4.

In general, when two members, each having a regular repeating pattern, are overlapped or superimposed, a so-called Moire is caused.

Figure 14A:
FIGS. 14A-D are diagrams used to explain the Moire appearance in a directly viewed cathode ray tube face.
Figure 14B:
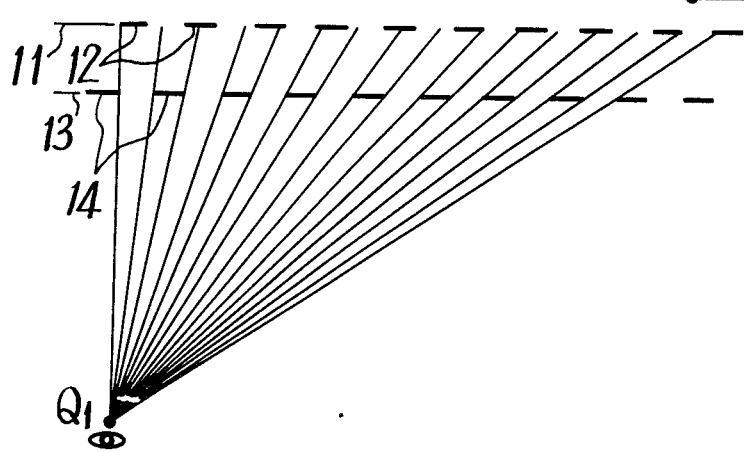
Figure 14C:
Figure 14D:
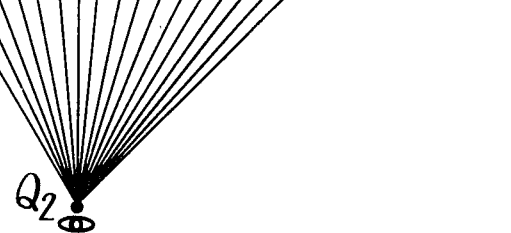

For example, as shown in FIG. 14B, under such a state that a light emitting member 12, which is extended perpendicular to a plane 11, is repeatedly located in the horizontal direction with a given alignment pitch and a light path selecting member 14, which passes therethrough given intervals of light, is located on a front plane 13 of the light emitting member 12, if the light emitting member 12 is viewed from a point $Q_1$ in front of the plane 13, due to the interference between the light emitting member 12 and the light path selecting member 14, the luminance distribution becomes as shown in FIG. 14A and accordingly there appears Moire. Also, when the light emitting member 12 is viewed from a point $Q_2$ as shown in FIG. 14D, the luminance distribution becomes as shown in FIG. 14C different from that shown in FIG. 14A and also another Moire is caused.

From the above analysis, when the phosphor face 1a of the color cathode ray tube 1 is viewed directly through the prism plate 70, Moire is generated in accordance with the viewing position. According to the above example of the present invention, however, the image light on the phosphor face 1a is passed through the prism plate 70 and then projected by the projection lens 3 on the screen 4 to form the magnified images 5a and 5b thereon. In this case, since the projection lens 3 has a large aperture, Moire is averaged and consequently no Moire is formed on the screen 4.

As mentioned just above, according to the above example of the present invention, the image light on the phosphor face 1a is passed through the prism plate 70 and then projected by the projection lens 3 on the screen 4 to form the magnified images 5a and 5b thereon. Therefore, the image of the prism plate 70 formed on the screen 4 is in phase and accordingly the images 5a and 5b are not affected thereby. Thus, even if the inclination angle of the prism face of the prism group 7 formed on the prism plate 70 is changed dependent on places or positions, such changes do not affect the image on the screen 4 or are not detected.

As described above, with the television receiver of the projection type according to the present invention, the prism groups are located close to the color cathode ray tube and the inclination angles of the prism faces of the prism groups are made different between the central and peripheral portions thereof to thereby make the difference in shift of the magnified images on the screen between their central and peripheral portions small so that it can be effectively avoided without generating any distortion in the image that the color stripe pattern is formed on the screen conspicuous.

In the above example of the invention, as shown in FIG. 10, the prism plate 70 has three prism groups different in the inclination angle at three steps in the horizontal direction such as at the central portion and both side peripheral portions. However, as shown in FIG. 15, such a prism plate 70 can be used in which in consideration of the shift in the vertical direction also, the inclination angle of the prism face is made different finely in both the horizontal and vertical directions. Therefore, the prism plate 70 may be more effective.

In the prism plates described above, the inclination angle of the prism face is varied linearly in the horizontal and vertical directions. It may be, however, possible to use such prism plates in which as shown in FIGS. 16 and 17, the prism plates 70 are divided into circles and ellipses with the center of the prism plate 70 as the center thereof and the inclination angles of the prism faces thereof are made different in the respective areas. In the examples of the prism plate 70 shown in FIGS. 16 and 17, it is of course necessary that the inclination angle of the prism face in the peripheral portions is selected smaller than that in the central portion. The same symbols used to refer to prism angles in the preceding description are used in FIGS. 16 and 17, with more remote peripheral portions being designated using the prime notation.

The above description is given on single preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A television receiver of the projection type comprising:
   a color cathode ray tube having a phosphor face with a color phosphor pattern and on which an image may be formed;
   a projection screen;
   projection lens means for projecting an image on said face of the cathode ray tube as a projected color pattern onto said projection screen; and
   prism plate means comprising a plurality of prisms disposed in front of said color cathode ray tube for splitting light from said color cathode ray tube into a plurality of images which are shifted relative to each other by a predetermined distance on said projection screen;
   characterized in that an inclination angle of each prism in a central portion of said prism plate means is different from an inclination angle of each prism in a peripheral portion of said prism plate means, whereby light forming the images is split by said prism plate means by different amounts, such that the split images are uniformly separated by a predetermined amount across the entire screen to reduce distortion.

2. A television receiver of the projection type according to claim 1, wherein
   said color phosphor pattern on said phosphor face is formed from successive sets of color stripes, each set including a red stripe, a green stripe and a blue stripe in a regular, spaced order;
   a color pitch of said pattern is equal to a distance between successive stripes of one color; and
   said predetermined distance is less than one color pitch.

3. A television receiver of the projection type according to claim 2, wherein said color phosphor pattern of said color cathode ray tube is a color stripe pattern.

4. A television receiver of the projection type according to claim 3, wherein said color stripe pattern is aligned vertically and said prism plate means splits light from said color cathode ray tube horizontally.

5. A television receiver of the projection type according to claim 1, wherein said inclination angle of each of said prisms of said prism plate means in said peripheral portion is smaller than said inclination angle of each of said prisms in said central portion.

6. A television receiver of the projection type according to claim 1, wherein said prism plate means comprises first and second transparent resin layers disposed adjacent each other so as to form a triangular wave shape at a boundary face of said first and second transparent resin layers.

7. A television receiver of the projection type according to claim 6, wherein said first resin layer is made of epoxy resin and said second resin layer is made of acrylic resin.

8. A television receiver of the projection type according to claim 6, further comprising a first glass plate disposed between a face plate of said color cathode ray tube and said prism plate means.

9. A television receiver of the projection type according to claim 8, further comprising a second glass plate covering said prism plate means.

10. A television receiver of the projection type according to claim 1, wherein said phosphor face of said cathode ray tube and said prism plate means are separated by a distance which is less than one third a distance separating said phosphor face and said projection screen.

* * * * *